(12) United States Patent
Birck et al.

(10) Patent No.: US 8,769,640 B2
(45) Date of Patent: Jul. 1, 2014

(54) REMOTE PUBLISHING AND SERVER ADMINISTRATION

(75) Inventors: Andrew Phillip Birck, Seattle, WA (US); Carlos Aguilar Mares, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 1098 days.

(21) Appl. No.: 12/129,404

(22) Filed: May 29, 2008

(65) Prior Publication Data
US 2009/0300731 A1 Dec. 3, 2009

(51) Int. Cl.
*H04L 29/06* (2006.01)

(52) U.S. Cl.
USPC .......................................................... 726/5

(58) Field of Classification Search
CPC . H04L 63/08; H04L 12/2856; H04L 41/0803; H04L 63/083; G06F 21/31
USPC .......................................................... 726/5
See application file for complete search history.

(56) References Cited

U.S. PATENT DOCUMENTS

| | | | |
|---|---|---|---|
| 6,199,082 B1 * | 3/2001 | Ferrel et al. | 715/205 |
| 6,295,607 B1 | 9/2001 | Johnson | |
| 6,327,628 B1 * | 12/2001 | Anuff et al. | 719/311 |
| 6,401,097 B1 * | 6/2002 | McCotter et al. | 1/1 |
| 6,493,749 B2 * | 12/2002 | Paxhia et al. | 709/220 |
| 6,605,120 B1 * | 8/2003 | Fields et al. | 715/239 |
| 6,606,744 B1 * | 8/2003 | Mikurak | 717/174 |
| 6,643,663 B1 * | 11/2003 | Dabney et al. | 1/1 |
| 7,047,411 B1 | 5/2006 | DeMello et al. | |
| 7,130,861 B2 * | 10/2006 | Bookman et al. | 1/1 |
| 7,266,594 B2 * | 9/2007 | Kumbalimutt et al. | 709/221 |
| 7,360,083 B1 * | 4/2008 | Ragireddy et al. | 713/160 |
| 7,502,853 B2 * | 3/2009 | Allamaraju et al. | 709/224 |
| 7,657,887 B2 * | 2/2010 | Kothandaraman et al. | 717/176 |
| 7,996,494 B2 * | 8/2011 | Allamaraju et al. | 709/218 |
| 2001/0010046 A1 * | 7/2001 | Muyres et al. | 705/52 |
| 2002/0120506 A1 * | 8/2002 | Hagen | 705/14 |
| 2002/0198965 A1 | 12/2002 | Kraft | |
| 2003/0172145 A1 * | 9/2003 | Nguyen | 709/223 |

(Continued)

OTHER PUBLICATIONS

Thilo Horstmann, Richard Bentley; Distributed Authoring on the Web with the BSCW Shared Workspace System; StandardView vol. 5, No. 1, Mar. 1997; ACM.*

(Continued)

*Primary Examiner* — Luu Pham
*Assistant Examiner* — James Turchen
(74) *Attorney, Agent, or Firm* — Ben Tabor; Sade Fashokun; Micky Minhas

(57) ABSTRACT

Embodiments are directed to managing server content and configuration from within a single server management application. In one embodiment, a computer system receives a client connection requesting initiation of a server management application. The computer system initiates the server management application. The application provides means managing content and server configuration settings from within the server management application. The computer system receives user input indicating a configuration settings change to be applied to the server and alters configuration settings on the server. The management application provides configuration access to those settings for which the client has access rights. The computer system receives user input indicating that one or more portions of content are to be published to the server and publishes the content portions to the server. The server management application implements a protocol provider model that facilitates content publishing to the server over a variety of different protocols.

20 Claims, 3 Drawing Sheets

(56) References Cited

U.S. PATENT DOCUMENTS

| | | | |
|---|---|---|---|
| 2004/0003139 A1 | 1/2004 | Cottrille et al. | |
| 2004/0250075 A1 | 12/2004 | Anthe, II et al. | |
| 2007/0043846 A1* | 2/2007 | Grayson et al. | 709/223 |
| 2007/0233689 A1 | 10/2007 | Carpenter et al. | |
| 2010/0235433 A1* | 9/2010 | Ansari et al. | 709/203 |

OTHER PUBLICATIONS

Secured Architecture for Remote Virtual Desktops; J. Rouzaud-Cornabas, N. Viot; 0-9785699-1-1/07/$25.00 © 2007 IEEE.*

Design, Implementation and Operation of a Large Enterprise Content Distribution Network; J.E. van der Merwe, P. Gausman, C.D. Cranor and R. Akhmarov; Sep. 2003, 8th International Workshop on Web Content Caching and Distribution.*

Software Configuration, Distribution, and Deployment of Web-Services; Rainer Anzböck, Schahram Dustdar, Harald Gall; SEKE '02, Jul. 15-19, 2002, pp. 649-656.*

Using WebDAV with IIS (9 pages) http://www.windowsnetworking.com/articles_tutorials/WebDAV-IIS.html.

How to Configure IIS Web Site Authentication in Windows Server 2003 (2 pages) http://support.microsoft.com/kb/324274.

Configure IIS Manager Authentication (3 pages) http://www.iis.net/articles/view.aspx/IIS7/Managing-IIS7/Using-FTP-Server-in-IIS7/Configure-IIS-Manager-Authentication.

Microsoft WebDAV Extension for IIS 7.0 (13 pages) http://www.iis.net/Downloads/files/webDAV/walkthru/Installing%20and%20Configuring%20WebDAV%20on%20IIS%207.0.htm.

* cited by examiner

REMOTE PUBLISHING AND SERVER ADMINISTRATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a server management application may be designed to allow a user to configure management settings on a server to which it is connected. Other software applications may be designed to allow a user to manage data files on a web server. For instance, the application may allow a user to upload, modify or delete data files stored on a server.

Typically, applications such as server management applications and content management applications establish communication links to the server so that changes made using the application can be propagated to the server. Each application creates its own connection, which may be limited to certain protocols or may be limited by an inability to transmit encrypted information. Furthermore, allowing for multiple connections from a variety of different applications may create additional security risks.

BRIEF SUMMARY

Embodiments described herein are directed to managing server content and configuration from within a single server management application. In one embodiment, a computer system receives a client connection requesting initiation of a server management application. The computer system initiates the server management application. The application provides for user interaction so the user can manage content and server configuration settings from within the server management application. The computer system receives user input indicating a configuration settings change to be applied to the server and alters configuration settings on the server. The management application provides configuration access to those settings for which the client has access rights. The computer system receives user input indicating that one or more portions of content are to be published to the server and publishes the content portions to the server. The server management application implements a protocol provider model that facilitates content publishing to the server over a variety of different protocols.

In an alternative embodiment, a computer system receives a client connection requesting initiation of a web server management application. The client connection request includes authentication credentials for creating a client application session. The computer system, based on the received client connection request and the authentication credentials, determines a web server management application scope of as use to be applied during the client application session. The computer system initiates the web server management application. The application provides a graphical user interface to facilitate user interaction with the application. The user interaction includes content publishing and server configuration settings management.

The computer system receives user input indicating a configuration settings change to be applied to the server and changes configuration settings on the server. The management application provides configuration access to those settings that are within the client's scope of use for the session. The computer system receives user input indicating that portions of content are to be published to the server and publishes the portions of web page content to the web server. The application is configured to use a variety of different communication protocols to publish web content to the server and remove content from the server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
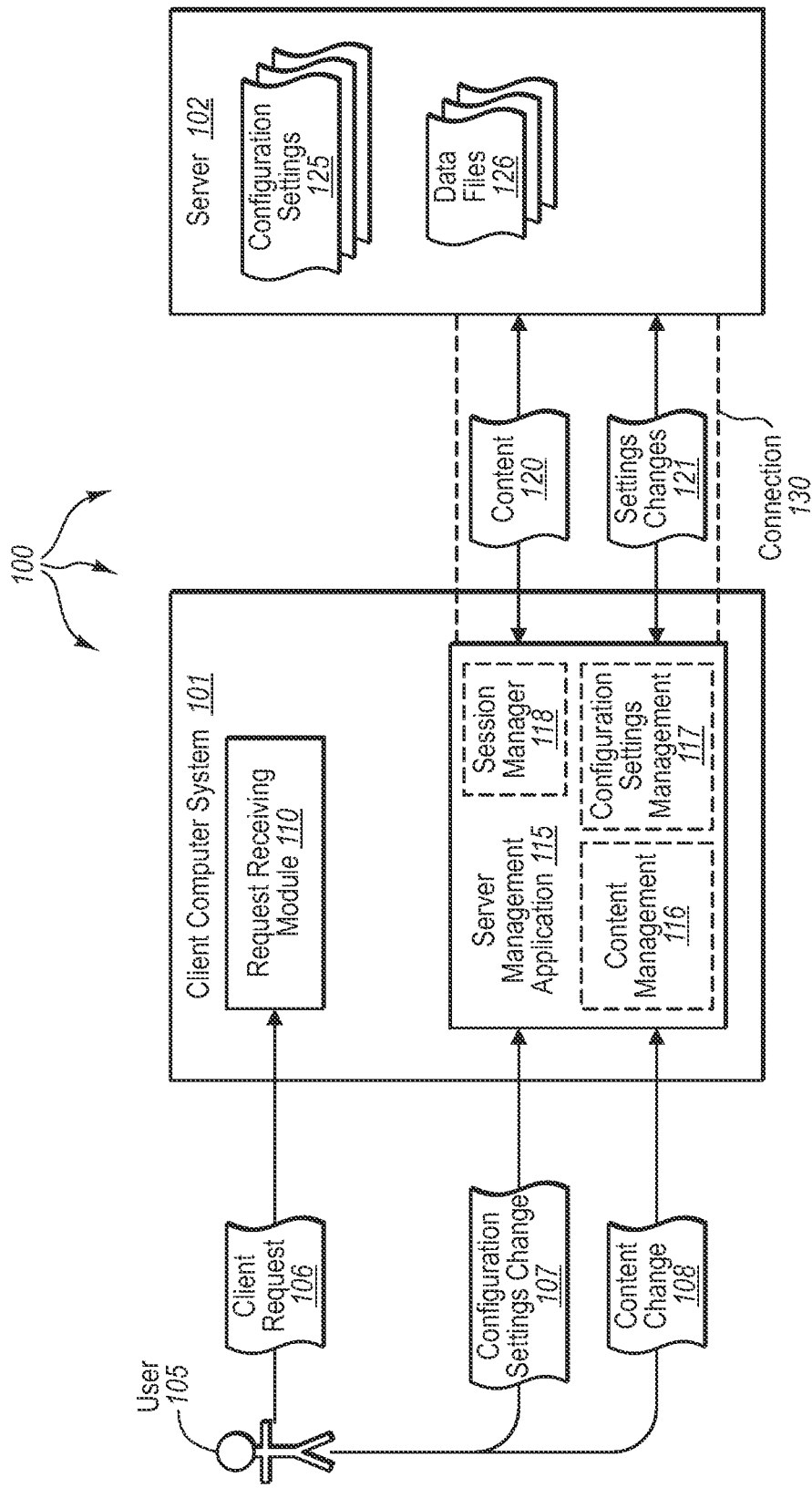
FIG. 1 illustrates a computer architecture in which embodiments of the present invention may operate including managing server content and configuration from within a single server management application.

Embodiments described herein are directed to managing server content and configuration from within a single server management application. In one embodiment, a computer system receives a client connection requesting initiation of a server management application. The computer system initiates the server management application. The application provides for user interaction so the user can manage content and server configuration settings from within the server management application. The computer system receives user input indicating a configuration settings change to be applied to the server and alters configuration settings on the server. The management application provides configuration access to those settings for which the client has access rights. The computer system receives user input indicating that one or more portions of content are to be published to the server and publishes the content portions to the server. The server management application implements a protocol provider model that facilitates content publishing to the server over a variety of different protocols.

In an alternative embodiment, a computer system receives a client connection requesting initiation of a web server management application. The client connection request includes authentication credentials for creating a client application session. The computer system, based on the received client connection request and the authentication credentials, determines a web server management application scope of as use to be applied during the client application session. The computer system initiates the web server management application. The application provides a graphical user interface to facilitate user interaction with the application. The user interaction includes content publishing and server configuration settings management.

The computer system receives user input indicating a configuration settings change to be applied to the server and changes configuration settings on the server. The management application provides configuration access to those settings that are within the client's scope of use for the session. The computer system receives user input indicating that portions of content are to be published to the server and publishes the portions of web page content to the web server. The application is configured to use a variety of different communication protocols to publish web content to the server and remove content from the server.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes client computer system 101. In some embodiments, client computer system 101 may be a server computing system configured to send and receive communication to and from other computing systems. Client computer system 101 may be configured to receive as client request 106 from user 105. User 105 may be any type of computer user including an end-user, administrator, developer, or other computer user. Client request may include an indication that server management application 115 is to be initiated.

In some embodiments, server 102 may be a web server. In such cases, a client (or hostee) may send information to the server (or host) indicating files that are to be uploaded or deleted (e.g. content change 108), or changes that are to be made to various server configuration settings (e.g. configuration settings change 107). In some embodiments, user 105 may be able to manage server content as well as make changes to one or more server configuration settings from within the same software application (e.g. server management application 115).

Client computer system 101 includes request receiving module 110. Request receiving module 110 may be configured to receive client request 106 and pass any information included in the request to server management application 115. Server management application 115 may be any type of software application including a web application, an applet, an embedded application, a pluggable module or any other type of application. Server management application 115 may include various portions that, in some embodiments, may be separate portions of application 115, and may be configured to run on separate computer systems. For instance, application 115 includes a content management portion 116 configured to allow user 105 to manage files on server 102. For example, a user may use content management portion 116 of application 115 to upload files to the server for publishing on a web site. Similarly, the user may be able to remove, replace, or otherwise change any files on server 102 to which the user has access. In some cases, access to server content may be limited based on the user's access rights. In such cases, any type of authentication or authorization scheme may be used, as dictated by session manager 118.

Server management application 115 also includes configuration settings management portion 117. Management portion 117 may be used to manage various server settings on server 102. For example, user 105 may adjust access rights for other users, server share size, bandwidth allocations, or any other server settings. Server management application 115 may be configured to send various content 120 and settings changes 121 to server 102 over communications link 130, in response to user input 106. Upon receiving content 120 and/or settings changes 121, server 102 may update data files 126 and/or configuration settings 125 based on the received changes. Communications link 130 may be any type of wired or wireless connection, and may implement any type of encrypted or unencrypted protocol. Link 130 may allow a user to send content 120 and settings changes 121 to server 102 over a single client-server connection.

Figure 2:
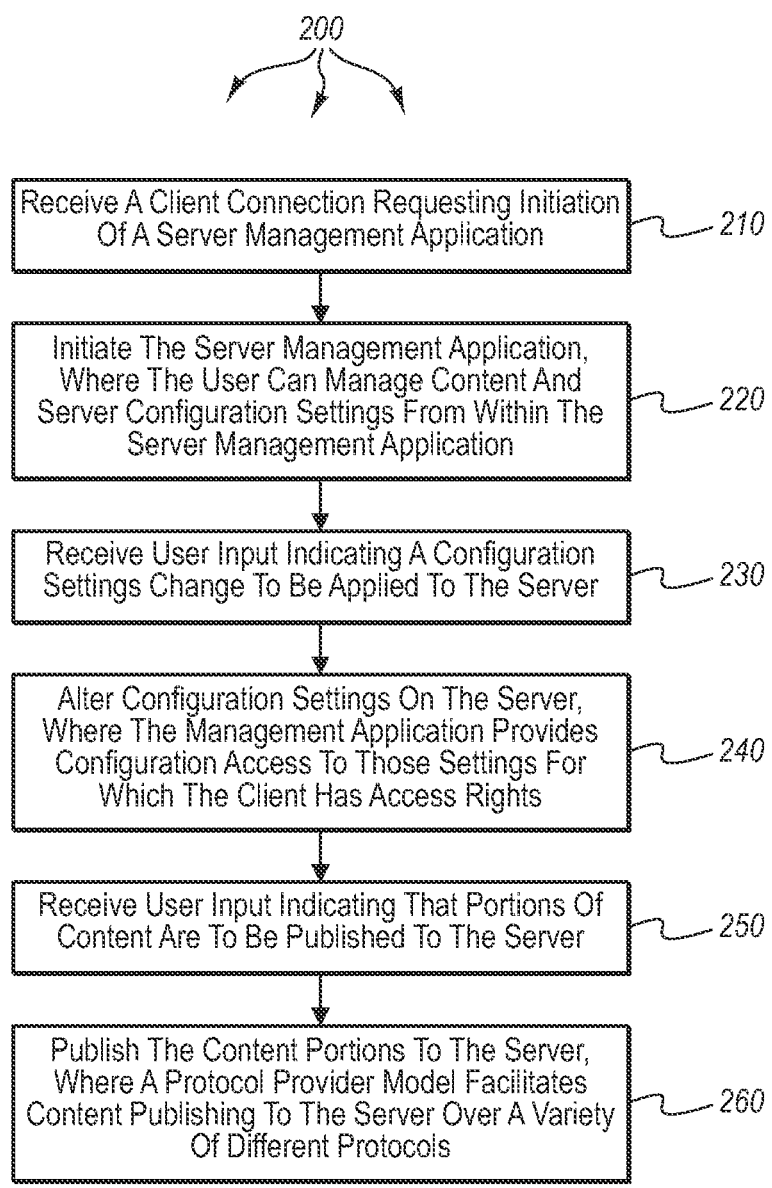
FIG. 2 illustrates a flowchart of an example method for managing server content and configuration from within a single server management application.

FIG. 2 illustrates a flowchart of a method 200 for managing server content and configuration from within a single server management application. The method 200 will now be described with frequent reference to the components and data of environment 100 of FIG. 1.

Method 200 includes an act of receiving a client connection requesting initiation of a server management application (act 210). For example, client computer system 101 may receive client request 106 requesting initiation of server management application 115. In some embodiments, client request 106 may further include client authentication credentials for authenticating the client prior to providing content and configuration settings access to server management application 115. For example, it may be advantageous to limit access to which content and/or configuration setting changes the user is permitted to make changes. For instance, server 102 may have as sensitive or confidential information. In other cases, the information may be innocuous or public information, in which case, authentication may be unnecessary. In embodiments where request 106 includes user 105's authentication credentials, user 105's ability to manage content and alter configuration settings may be scoped according to the user's authentication credentials and corresponding access rights.

In some embodiments, it may be determined that at least a portion of server management application 115 is not installed on client computer system 101. In such cases, installation software may be sent to system 101 including the at least one portion of the server management application. The software may be a pluggable module, installable on client computer system 101 as a separate application, or as part of an existing application. In some cases, server management application 115 may plug in to an existing (web) server management application. Application 115 would then provide additional functionality to the existing server management application.

Method 200 includes an act of initiating the server management application, where the application provides for user interaction such that the user can manage content and server configuration settings from within the server management application (act 220). For example, client computer system 101 may initiate server management application 115, where application 115 provides for user interaction, allowing user 105 to manage content and server configuration settings from within server management application 115. For instance, application 115 may provide a graphical user interface (GUI) or other user interface to allow the user to interact with and make changes to application 115, which are passed on to server 102. In cases where application 115 is a pluggable module providing additional functionality to an existing server management application, application 115 may provide additional selectable options in the GUI for the user to use when managing server 102.

In some embodiments, server management application 115 may be multithreaded, allowing for multiple concurrent file transfers. For example, in cases where user 105 desires to upload multiple files or make multiple configuration settings changes, application 115 may operate on a plurality of threads, each thread servicing a different user modification request.

Method 200 includes an act of receiving user input indicating a configuration settings change to be applied to the server (act 230). For example, client computer system 101 may receive configuration settings change 107 from user 105 indicating at least one configuration settings change that is to be applied to server 102. As mentioned above, user 105 may desire to modify or enact new configuration settings on server 102. Access to these settings change capabilities may be provided by server management application 115.

Method 200 includes an act of the server management application altering one or more configuration settings on the server, the management application providing configuration access to those settings for which the client has access rights (act 240). For example, server management application 115 may alter configuration settings 125 on server 102 by sending configuration settings changes 121 to server 102, where server management application 115 provides configuration access to those settings (125) for which user 105 has access rights. As mentioned above, user 105's ability to modify or add new configuration settings may be limited by a grant or denial of certain access rights. For example, user 105 may be able to change bandwidth allocations on server 102, but not be able to change allocated server share size. In other situations, different rights may be granted and others denied. In some cases, such as where user 105 is a system administrator, user 105 may have full settings management rights on server 102 and may be authorized to make any desired changes.

Method 200 includes an act of receiving user input indicating that one or more portions of content are to be published to the server (act 250). For example, client computer system 101 may receive content change 108 indicating that one or more portions of content are to be published to server 102. Although content publishing is specifically mentioned here, it should be noted that content management encompasses removing, altering or adding files or other content to/from server 102. Server management application 115 may send content changes 120 to server 102, on which the changes will be carried out (i.e. the files will be uploaded or otherwise modified, as indicated by received content change 108.

Method 200 includes an act of the server management application publishing the content portions to the server, the management application implementing a protocol provider model that facilitates content publishing to the server over a variety of different protocols (act 260). For example, server management application 115 may publish content 120 to server 102, where application 115 implements a protocol provider model that facilitates content publishing to server 102 over a variety of different protocols. In some embodiments, the protocol provider model of application 115 may provide a default protocol over which either or both of content 120 or settings changes 121 are sent. In some cases, the information sent over the default protocol is encrypted, such as when the secure sockets layer (SSL) over hypertext transfer protocol (HTTP) is used. Any other protocol may be used including file transfer protocol (FTP), web-based distributed authoring and versioning (WebDAV), transmission control protocol (TCP), internet protocol (IP), or other protocols.

In some cases, files published to server 102 are transmitted on a chunk by chunk basis, where the size of the data chunks are configurable by user 105. This allows the user to take network size, efficiency, and available bandwidth into consideration, and modify the data chunks to an optimum size for their particular network. In some cases, a communications link may be instantiated between client computer system 101 and server 102 using the protocol provider model. Either or both of content 120 and settings changes 121 may be transmitted using the instantiated connection. As illustrated in FIG. 1, both configurations settings 125 and data files 126 may be managed on server 102 using a single connection 130. Connection 130 may allow user 105 to send both content changes (e.g. 120) and configuration settings changes (e.g. 121) to server 102 using the protocol of their choice, and further using any desired encryption schemes. Thus, all communication over connection 130 may be encrypted, allowing the user safe access to potentially sensitive or confidential information.

Figure 3:
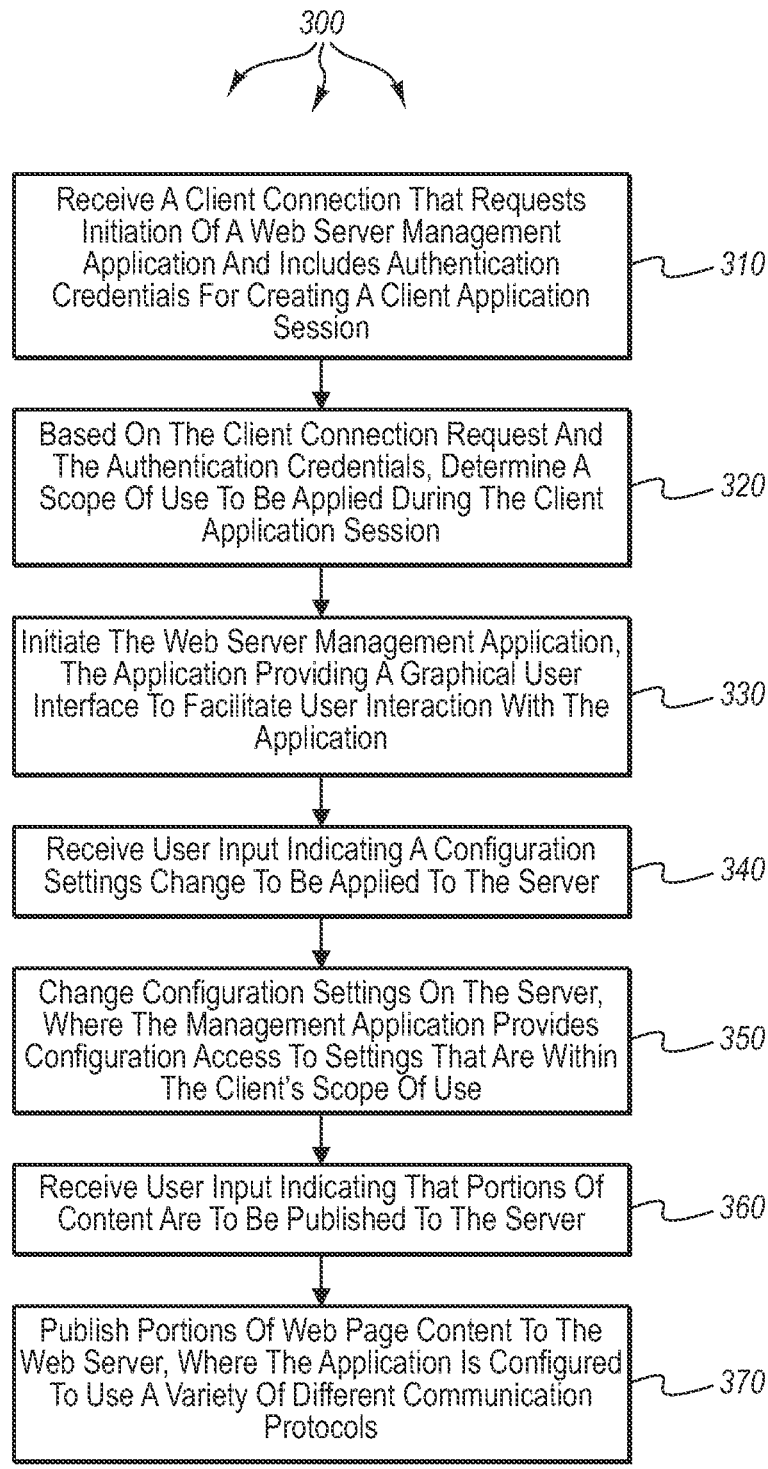
FIG. 3 illustrates a flowchart of an example method for managing web server content and configuration from within a single server management application.

FIG. 3 illustrates a flowchart of a method 300 for managing web server content and configuration from within a single server management application. The method 300 will now be described with frequent reference to the components and data of environment 100.

Method 300 includes an act of receiving a client connection requesting initiation of a web server management application, the client connection request including authentication credentials for creating a client application session (act 310). For example, client computer system 101 may receive client connection request 106 requesting initiation of web server management application 115. Request 106 may include authenticating credentials for creating a client application session. Session manager portion 118 of web server management application 115 may establish a client session with server 102 using the authentication credentials. During such a as session, user 105 may be able to adjust all configuration settings 125 and modify all data files 126 to which the user has access rights.

In some embodiments, client computer system 101 may determine that at least a portion of web server management application 115 is not installed on client computer system 101, and may request to be sent installation software including the at least one portion of the server management application for installation on the system. As indicated above, web server management application 115 may be installed with all of portions 116, 117 and 118, or, alternatively, each portion may be individually installable. Moreover, application 115 may be installed as a standalone software application, or may be a pluggable module into an existing server management application or other internet server framework.

Method 300 includes an act of, based on the received client connection request and the authentication credentials, determining a web server management application scope of use to be applied during the client application session (act 320). For example, based on client connection request 106 and the included authentication credentials, session manager 118 may determine a web server management application scope of use to be applied during the client application session. The scope of use is intended to limit the configuration settings and data files to which the user has access. In some embodiments, user 105's access rights may be automatically scoped based on the user's login credentials.

Method 300 includes an act of initiating the web server management application, where the application provides a graphical user interface to facilitate user interaction with the application, and the user interaction includes content publishing and server configuration settings management (act 330). For example, client computer system 101 may initiate web server management application 115. Application 115 may provide a GUI to facilitate user interaction with application 115. Such user interaction may include content publishing and server configuration settings management. In some cases, the GUI may be provided as a web application in a web browser. The GUI may provide drag and drop support for publishing data files to the web server. For example, user 105 may be able to drag a file from a local folder onto a server folder, upon which the file is automatically transferred to the server over communication link 130.

Method 300 includes an act of receiving user input indicating a configuration settings change to be applied to the server (act 340). For example, web server management application 115 may receive configuration settings change 107 indicating one or more changes that are to be applied to configuration settings 125 on server 102. The changes may indicate any type of server configuration or other settings changes, and may be applicable to the server as a whole, or just to user 105's assigned share(s) on server 102.

Method 300 includes an act of the web server management application changing one or more configuration settings on the server, where the management application provides configuration access to those settings that are within the client's scope of use for the session (act 350). For example, web server management application 115 may change one or more configuration settings 125 on server 102. Application 115 may provide configuration access to those settings that are within client 105's scope of use for the session established by session manager 118. During the session, changes may be communicated over connection 130, and may be encrypted, and may be transferred using a user-selectable protocol.

Method 300 includes an act of receiving user input indicating that one or more portions of content are to be published to the server (act 360). For example, web server management application 115 may receive content change 108 indicating that one or more portions of content are to be published to server 102. Content publishing, as used herein, may include modifying, removing, updating, creating or otherwise changing data files 126 on server 102. Like configuration settings changes 122, content 120 may be sent to server 102 over communications link 130, and may be encrypted. Moreover, the content changes may be communicated using a user-selected protocol, which may be different than the protocol used to transfer settings changes 121.

Method 300 includes an act of the web server management application publishing one or more portions of web page content to the web server, where the application is configured to use a variety of different communication protocols to publish web content to the server and remove content from the server (act 370). For example, web server management application 115 may publish portions of web page content (e.g. content 120) to web server 102, where application 115 is configured to use a variety of different communication protocols to publish web content 120 to server 102 and remove content from server 102. In some embodiments, web server management application 115 may provide a default protocol, where the default protocol is configured to transmit encrypted information to and from web server 102. In some cases, the default protocol used for communications link 130 is SSL over HTTP. Additionally or alternatively, other types of encrypted and non-encrypted protocols may be used to transfer information between web server management application 115 and server 102. For example, FTP, WebDAV, TCP/IP or any other protocol may be used in link 130.

Using the aforementioned principles, a user may be able to configure various server settings as well as manage server content from a single software application, over a single (encrypted) communications link. In cases where a user is already using a server management application, one or more portions of application 115 may be installed or added onto the existing server management application, providing extended functionality to the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing server content and configuration from within a single server management application at a computer system in a computer networking environment, the method comprising:
   receiving a client connection including authentication credentials requesting initiation of a server management application;
   initiating the server management application, the application including both a content management portion and a server configuration settings management portion, the application providing for user interaction such that the user can manage both content and server configuration settings from within the server management application;
   based on the received client connection request and the authentication credentials, determining a web server management application scope of use to be applied during a client application session, the web server management application scope of use including both a content management scope of use and a configuration settings scope of use, the configuration settings scope of use comprising server share size and bandwidth allocations;
   receiving user input indicating a configuration settings change to be applied to the server;
   the server management application altering one or more configuration settings on the server, the management application providing configuration access to those settings for which the client has access rights and are within the web server management application scope of use for the client application session;
   receiving user input indicating that one or more portions of content are to be published to the server; and
   the server management application publishing the content portions to the server, the management application implementing a protocol provider model that enables content publishing to the server using each of a plurality of different protocols and wherein content changes are communicated to the server using a user-selected one of the plurality of different protocols.

2. The method of claim 1, further comprising:
   an act of determining that at least a portion of the server management application is not installed on the client's computer system; and
   an act of sending the installation software including the at least one portion of the server management application to the client.

3. The method of claim 1, further comprising: authenticating the client prior to providing content and configuration settings access to the server management application.

4. The method of claim 3, wherein the client's ability to manage content and alter configuration settings is scoped according to the client's authentication credentials.

5. The method of claim 1, wherein the protocol provider model of the server management application provides a default protocol.

6. The method of claim 5, wherein the information transmitted over the default protocol is encrypted.

7. The method of claim 6, wherein the default protocol is SSL over HTTP.

8. The method of claim 1, wherein the server management application is multithreaded, allowing for multiple concurrent file transfers.

9. The method of claim 1, wherein files published to the server are transmitted on a chunk by chunk basis, the size of the data chunks being configurable by a user.

10. The method of claim 1, further comprising an act of instantiating a communications link between the client and the server using the protocol provider model.

11. The method of claim 10, wherein the content publishing and configuration settings altering are both performed using the instantiated connection.

12. A method for managing web server content and configuration from within a single server management application at a computer system in a computer networking environment, the method comprising:
   receiving a client connection requesting initiation of a web server management application, the client connection request including authentication credentials for creating a client application session;
   initiating the web server management application, the application including both a content management portion and a server configuration settings management portion, the application providing a graphical user interface to facilitate user interaction with the application, the user interaction including both content publishing management and server configuration settings management;
   based on the received client connection request and the authentication credentials, determining a web server management application scope of use to be applied during the client application session, the web server management application scope of use including both a content management scope of use and a configuration settings scope of use, the configuration settings scope of use comprising server share size and bandwidth allocations;
   receiving user input indicating a configuration settings change to be applied to the server;
   the web server management application changing one or more configuration settings on the server, the management application providing configuration access to those settings that are within the web server management application scope of use for the client application session;
   receiving user input indicating that one or more portions of content are to be published to the server; and
   the web server management application publishing one or more portions of web page content to the web server, the application enabled to use each of a plurality of different communication protocols to publish web content to the server and remove content from the server and wherein content changes are communicated using a user-selected one of the plurality of different communication protocols.

13. The method of claim 12, further comprising:
an act of determining that at least a portion of the server management application is not installed on the client's computer system; and
an act of sending the installation software including the at least one portion of the server management application to the client.

14. The method of claim 12, wherein the graphical user interface is provided as a web application in a web browser.

15. The method of claim 12, wherein the graphical user interface provides drag and drop support for publishing data files to the web server.

16. The method of claim 12, wherein the web server management application is a separately-installable module to an internet server framework.

17. The method of claim 12, wherein the web server management application provides a default protocol, the default protocol being configured to transmit encrypted information to and from the web server.

18. A computer program product stored on a hardware storage device for implementing a method for managing server content and configuration from within a single server management application, the computer program product comprising computer-executable instructions that, when executed by one or more processors of the computing system, cause the computing system to perform the method, the method comprising:
receiving a client connection including authentication credentials requesting initiation of a server management application;
initiating the server management application, the application including both a content management portion and a server configuration settings management portion, the application providing for user interaction such that the user can manage both content and server configuration settings from within the server management application;
based on the received client connection request and the authentication credentials, determining a web server management application scope of use to be applied during a client application session, the web server management application scope of use including both a content management scope of use and a configuration settings scope of use, the configuration settings scope of use comprising server share size and bandwidth allocations;
receiving user input indicating a configuration settings change to be applied to the server;
the server management application altering one or more configuration settings on the server, the management application providing configuration access to those settings for which the client has access rights and are within the web server management application scope of use for the client application session;
receiving user input indicating that one or more portions of content are to be published to the server; and
the server management application publishing the content portions to the server, the management application implementing a protocol provider model that facilitates content publishing to the server using each of a plurality of different protocols and wherein content changes are communicated using a user-selected one of the plurality of different protocols.

19. The computer program product of claim 18, further comprising an act of instantiating a communications link between the client and the server using the protocol provider model.

20. The computer program product of claim 19, wherein the content publishing and configuration settings altering are both performed using the instantiated connection.

* * * * *